May 10, 1932. L. T. LITTLEFIELD 1,857,204
APPARATUS FOR USE IN FACTORY MANAGEMENT
Filed Dec. 22, 1928    5 Sheets-Sheet 1
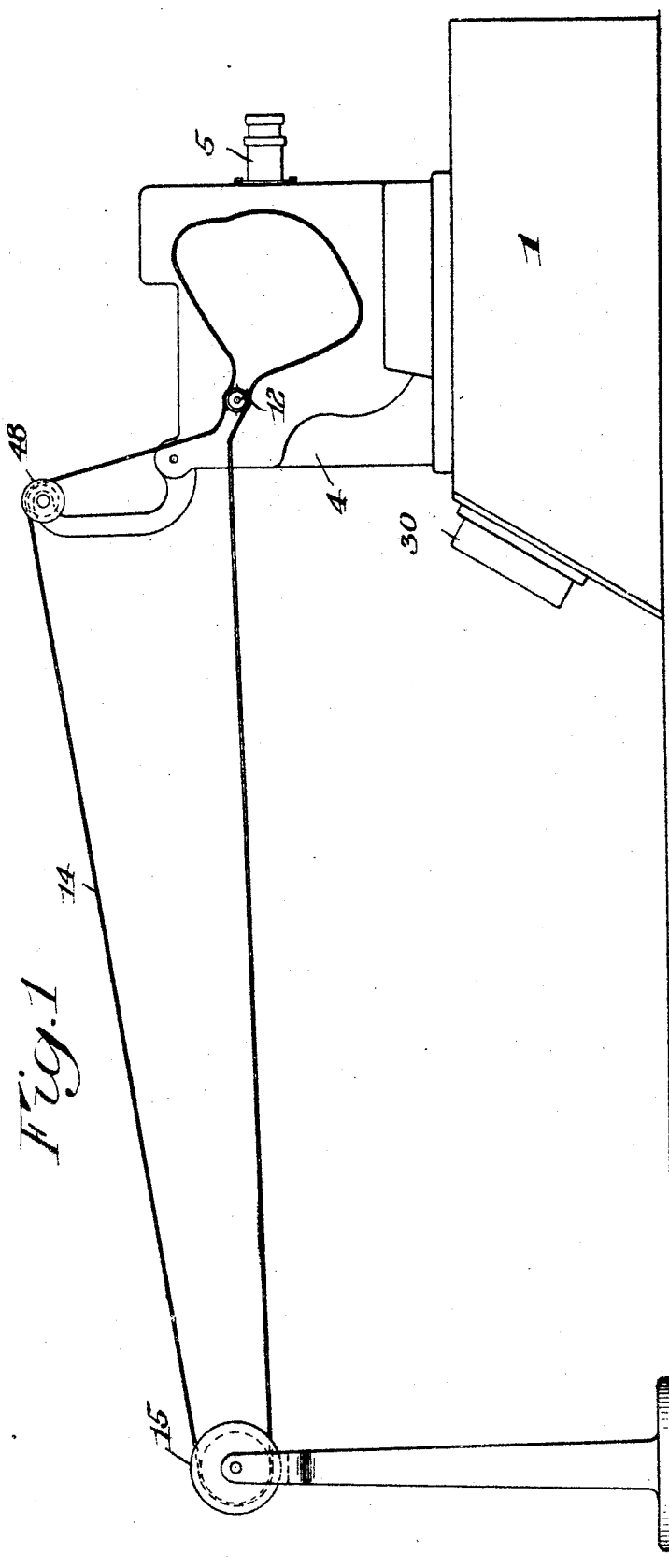
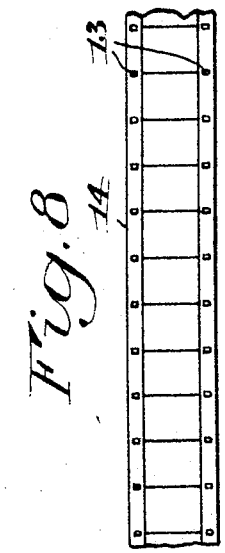
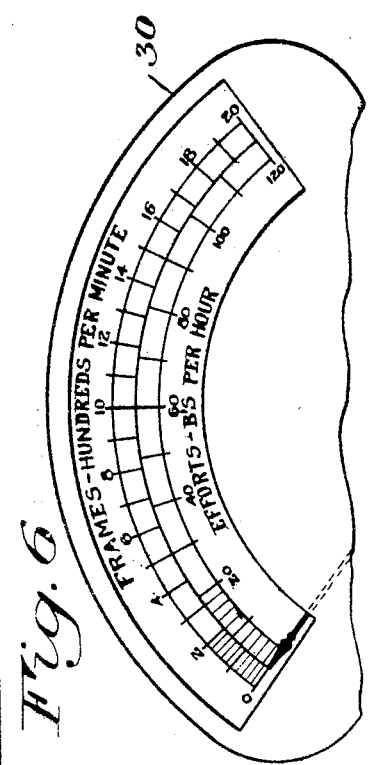
INVENTOR
Laurence T. Littlefield
BY
ATTORNEYS.

May 10, 1932.  L. T. LITTLEFIELD  1,857,204
APPARATUS FOR USE IN FACTORY MANAGEMENT
Filed Dec. 22, 1928   5 Sheets-Sheet 2
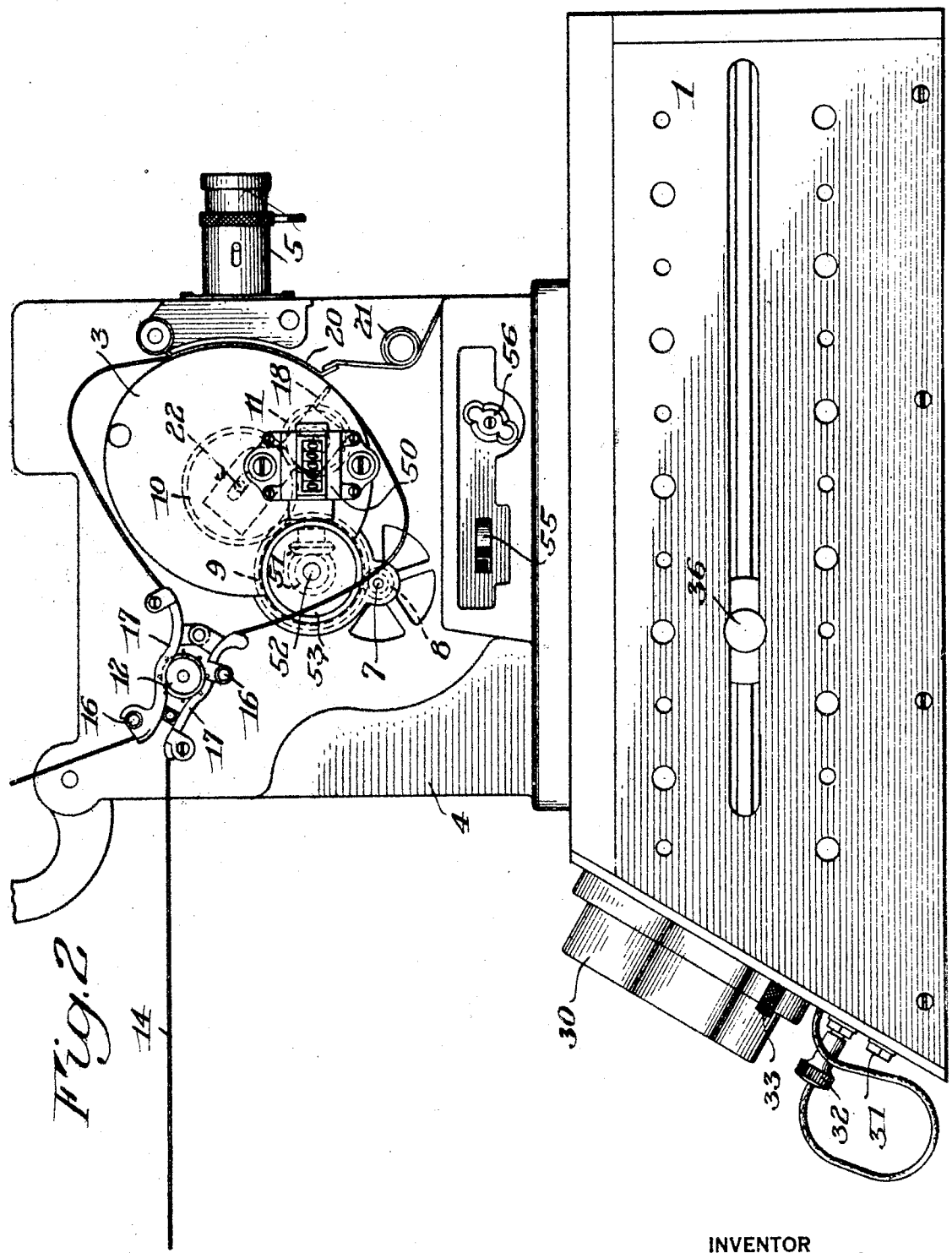
INVENTOR
Laurence T. Littlefield
BY
ATTORNEYS.

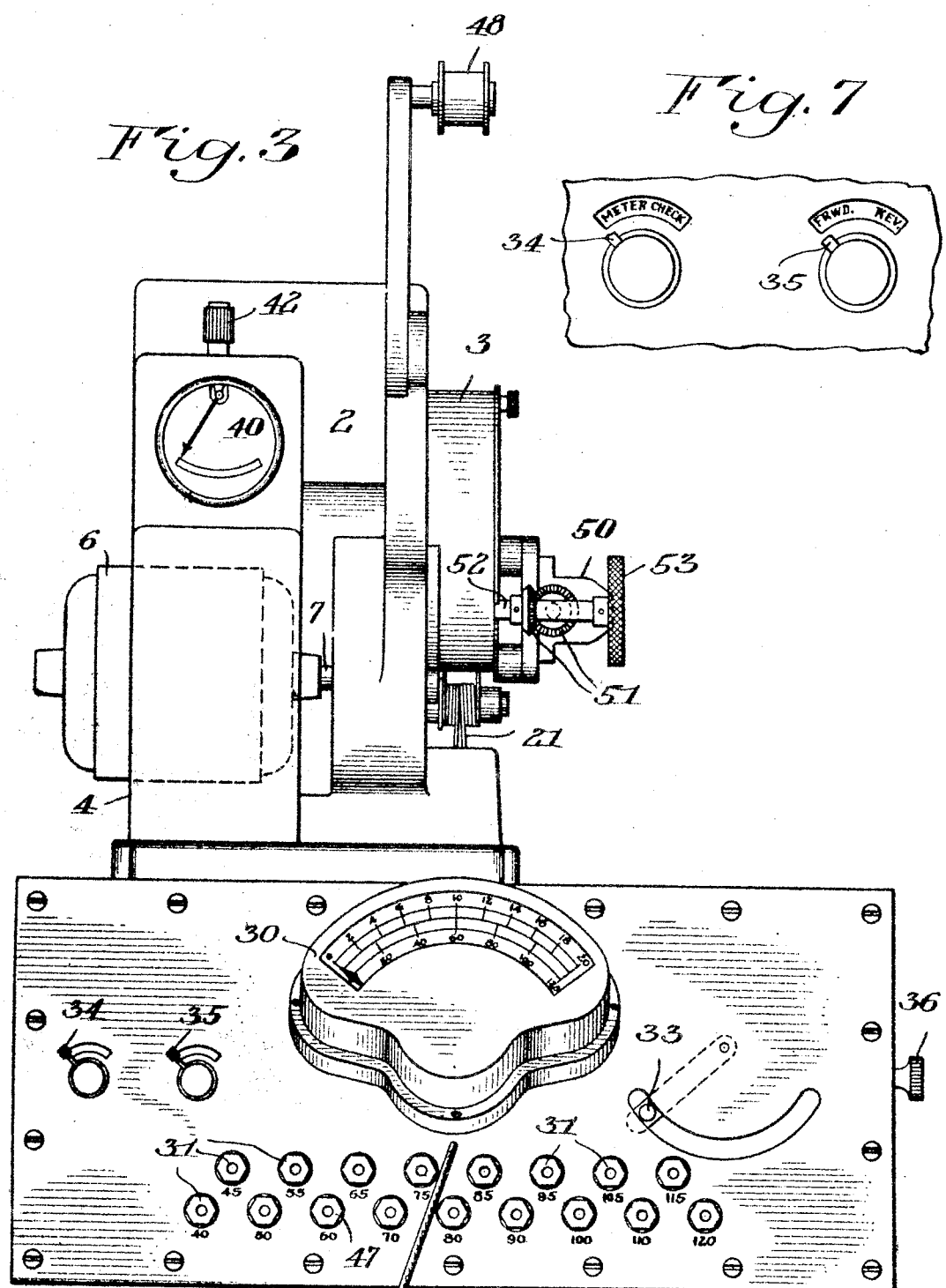

May 10, 1932. L. T. LITTLEFIELD 1,857,204
APPARATUS FOR USE IN FACTORY MANAGEMENT
Filed Dec. 22, 1928 5 Sheets-Sheet 4

INVENTOR
Laurence T. Littlefield
BY
ATTORNEYS.

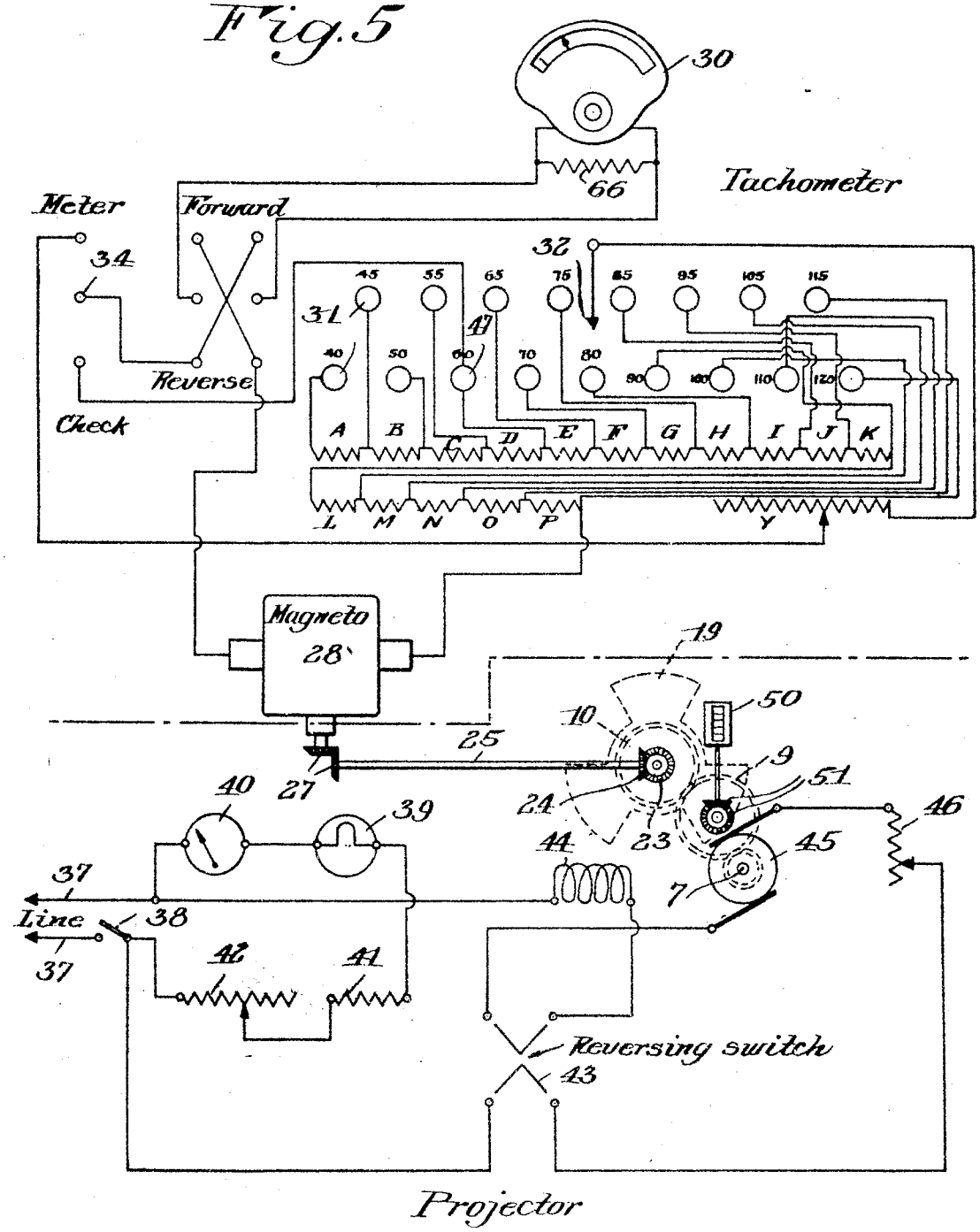

Patented May 10, 1932

1,857,204

UNITED STATES PATENT OFFICE

LAURENCE T. LITTLEFIELD, OF ROCHESTER, NEW YORK, ASSIGNOR TO EASTMAN KODAK COMPANY, OF ROCHESTER, NEW YORK, A CORPORATION OF NEW YORK

APPARATUS FOR USE IN FACTORY MANAGEMENT

Application filed December 22, 1928. Serial No. 327,917.

This invention relates to photography and more particularly to apparatus for use in studying a cycle of operations such as for time study purposes.

One feature of this invention is the provision of apparatus which will facilitate the determination of the correct method or process by which a given operation or cycle of operations is to be performed. Another feature of the invention is the provision of means to facilitate the accurate determination of the time required for each element of the cycle of operations as it is performed by the operator or machine studied. Another feature of the invention relates to the provision of means for the determination of working "speed" of the operator studied relative to a "speed" adopted as a standard in a wage incentive system. A further feature of the invention relates to the provision of means whereby time study men may be trained in actual timing of manufacturing operations in a projection room apart from the manufacturing plant without distracting in any way the attention of workmen engaged in manufacturing. A further feature of the invention includes the provision of means whereby a selected cycle of operations may be reproduced as a continuous repetition of said cycle of operations at any one of a number of desired speeds to facilitate the studying of any series of operations with a view to determining the most efficient method or process and for properly determining the unit of productive effort for a given unit of time in any wage incentive system.

For a clearer understanding of the invention reference is made to the drawings wherein like characters denote like parts throughout; in which Fig. 1 is a side elevation of a preferred form of the invention with many of the detail parts omitted to give a general idea of the invention;

Fig. 2 is an enlarged side view of a portion of the same side of the apparatus represented in Fig. 1;

Fig. 3 is a rear view of the device disclosed in Fig. 2 showing an instrument panel together with indicating and controlling equipment mounted thereon;

Fig. 5 is a diagrammatic showing of the electrical indicating arrangement including the controlling circuits together with certain of the mechanical elements shown in the foregoing figures;

Fig. 6 is an enlarged view of the metering scale shown in Fig. 3;

Fig. 7 is an enlarged view of the switches and associated legends shown at the left of the panel of Fig. 3; and Fig. 8 is a section of photographic film or other photographic record suitable for use in the present invention.

Figure 4:
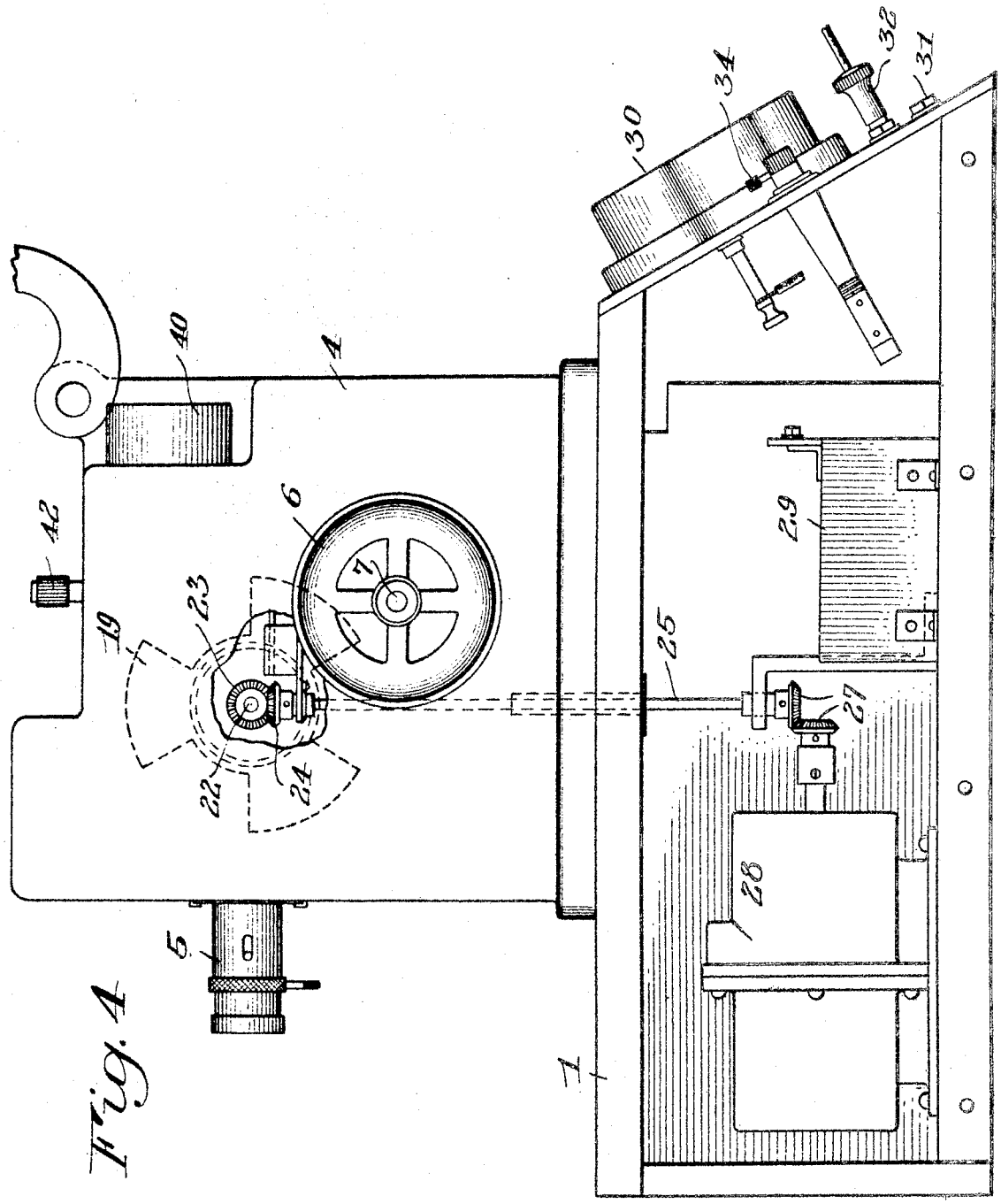
Fig. 4 is a side view with a side panel removed, of the projector and associated equipment looking in the opposite direction from Fig. 2.

In a co-pending application a method has been disclosed for the determination of an efficient process by which a given operation is to be performed. This method also contemplates the determination of the time required for each element of the operation as it is performed by the operator studied relative to a speed adopted as standard for the given wage incentive system used. Different phases of the method contemplate the use of a photographic record in the form of a loop preferably consisting of a photographic film on which there is recorded a cycle of operations which may be continuously projected as a series of repetitions of the operations to be studied. This record is made by photographing an operator or machine at work by means of a camera driven at a constant predetermined speed preferably 1000 frames or pictures per minute. From this record a complete cycle of operations is selected and formed into a loop of photographic record or film to be projected at various speeds in the device of the present invention which includes indicating means arranged to calculate certain information for the time study analyst.

Broadly this invention consists of an arrangement in combination with a motion picture projector of means whereby a continuous loop of film may be projected to represent an operator or machine reproducing a series of repetitions of said cycle of operations together with indicating means to show the speed of projection and the speed of movement of the object photographed.

In the preferred embodiment of the invention the numeral 1 designates a cabinet in which there is provided electrical tachometer equipment hereinafter described. On the top of the cabinet there is mounted a motion picture projector of any well-known type but preferably one in which the direction of the film can be reversed and in which clutch mechanism is provided to stop the film promptly so that any of its frames may be projected as a still picture. The projector of which only certain portions are shown to disclose the manner in which the electrical tachometer is operated, includes a frame carrying a lamp house 2, a housing 3 and a front flange 4. On this flange there is secured a lens mount 5 containing an objective not shown and suitable means for focusing this objective. At the rear of the frame there is mounted a motor 6 which may be of any type that operates without speed variation at any of a number of speeds although a series type motor has been found to be especially satisfactory in operation. The shaft 7 of the motor carries a motor pinion 8 shown in dotted lines in Fig. 2 which in turn drives a train of gears including an intermediate gear 9, a large pull down gear 10 and small pull down gear 11 to actuate the sprocket 12 through other gears (not shown). This sprocket engages the openings 13 in the loop of film 14 so that it may be rotated around a pulley 15 and guide roller 48, behind the idlers 16 mounted on the guide members 17 which are linked together to provide an arrangement for facilitating the passage of the film therethrough. From the guide members 17 the film then passes around the surface of a portion of the housing 3 which contains the shutter mechanism 19 indicated in dotted lines in Fig. 4, past the usual framing gate 20 to press the film into position behind the objective. An auxiliary spring 21 is also provided since frequently the movement of the film is so fast that in the absence of this spring there would be a tendency for the frames of the film to overthrow or move to a point where they would not be properly positioned behind the objective. There is also indicated in dotted lines in Fig. 2 a pull down arm 18 arranged for actuation from cams (not shown) carried by gears 10 and 11 of said train, to engage the openings 13 of the film so that it is progressively moved one frame at a time past the objective. On the base of the frame there is provided an off-and-on switch 55 for placing the projector in operation and a reversing switch 56 which reverses the direction of current to the motor 6 in such a way that the film can be moved forward or in reverse. The foregoing mechanism of the projector independent of the pulley 15 is well-known in the art but has been described briefly to give a proper background for setting forth the invention.

In accordance with the present invention a Veeder counter used to count the number of frames projected and mechanical means for driving the electrical tachometer have been added to the projector. This counter shown at 50 in Fig. 2 is driven by bevel gears 51 in turn driven from the shaft 53 by which a person operating the projector can manually drive the film through the projector. The drive mechanism for the electrical tachometer includes a miter gear 23 (Fig. 4) mounted on a shutter shaft 22 on which the large pull down gear 10 is secured and which is driven at the same speed as the shutter 19. This gear 23 engages its companion gear 24 mounted on a vertical shaft 25 through which a second pair of miter gears 27 drives a magneto 28.

The magneto 28 has an inherent characteristic of producing electrical energy in direct proportion to the speed at which it is driven that is, if it is driven at 500 revolutions per minute the E. F. M. output is three volts, at 1000 revolutions per minute six volts and at 2000 revolutions per minute twelve volts. This magneto is a part of an electrical tachometer which with the circuits indicated above the dotted line in Fig. 5 provides an indicating arrangement that may be operated to give various information to the analyst or the person operating the projector. In addition to the magneto 28 there is mounted within the cabinet 1 a series of resistance units 29, the wiring of which has been omitted from Fig. 4 in order that this showing might not be unnecessarily complicated but it will be understood from Fig. 5 how the various parts of the equipment are electrically connected in the circuit network. On the rear of the cabinet 1 there is provided a panel supporting a voltmeter 30 which is a six-volt range meter and which is provided with a special two range scale, the upper scale indicating the number of frames or pictures projected per minute while the lower scale is graduated in effort per unit of time or B's per hour in which B represents a standard unit of effort per unit of time. On the front of this panel there is also mounted a series of jacks 31 into which a plug 32 may be inserted as will be further described in connection with the circuit diagram of Fig. 5. This panel also includes an opening through which there passes a handle 33 connected to the movable element of a variable resistance Y which is in the nature of a units adjustment made necessary because the resistances connected to jacks 31 are calibrated in multiples of five units. There is also mounted on this panel the handle 34 of a double pole double throw switch movable in an arc from the position indicated by the legend "Meter" to the position indicated by the legend "Check" (Fig. 7). Similarly the handle 35 represents a single pole double throw switch movable from a position indicated "Frwd." to a position indicated by the legend "Rev." (Fig. 7). On the side of the cabinet there is shown a handle 36 which actuates a variable resistance unit 46 to control the speed of the motor 6.

Referring to Fig. 5 the electrical operation will best be understood by describing the function of the various circuits shown. A suitable source of current is connected under the control of switch 38, to the lamp 39 of the projector through conductors 37 in series with ammeter 40, fixed resistance unit 41 and adjustable resistance unit 42. The resistance unit 42 is connected in series with the lamp 39 to vary the current flowing therethrough and consequently the amount of light transmitted by said lamp into said projector. The current conductors 37 are also extended through a suitable reversing switch 43 to connect the field 44 of the motor 6 in series with the current source. This reversing switch also closes a circuit through the armature 45 of the motor which circuit includes a rheostat 46 to control the motor speed. The shaft 7 of the motor, as was previously described in connection with Fig. 2, has a gear which cooperates with the train of gears 9 and 10 to drive the magneto 28 through the miter gears 23 and 24, shaft 25 and the second pair of miter gears 27.

The magneto when driven in the manner just described generates electrical energy in direct proportion to the speed at which it is driven. The voltmeter 30 connected to the output of this magneto through a circuit network, is used as an indicating device and has a resistance 66 shunted across its terminals to act as a loading coil for the rest of the circuit in such a way that it increases the current in the present circuit six times what the meter normally takes. The rest of the circuit network consists of a number of small fixed resistance coils designated A to P inclusive. In the absence of resistance 66, the resistance of these various units A to P would be six times their present size. It will be noted that these units are connected in series with each other and also are connected to the jacks 31 and they are so calibrated that when the plug 32 is inserted in any jack the reading on the lower scale of the meter 30 will correspond with the number associated with that jack. These numbers will be understood are equal to a certain number of units of effort per unit of time. In order to obtain meter readings of values other than those indicated by jack 31 the variable resistance Y is employed but in all other cases this variable resistance should be in its zero position. Two other conditions must also be observed in order to obtain the right meter reading, one of which is that the photographic film speed be 1,000 frames per minute, since this film was photographed at this speed, and the other is that the single pole, double throw switch 34 be closed on the "meter side".

It will be noted that the other position of this switch, designated "Check," is used to check the speed of the projector, that is to indicate the frames projected per minute, which readings are shown on the upper scale of the meter 30. This switch 34 gives the value of $60^B$ units per hour independent of what jack is being used, provided the speed is 1000 frames or R. P. M. This is due to the fact that the jack 47 corresponding to this value is connected to the check position of the switch 34. The double pole double throw switch 35 is used to change the polarity of the circuit so that the meter will always register irrespective of the direction of rotation of the magneto. It will be understood that the meter 30 will give full scale deflection on the lower scale on 1000 R. P. M. and also may be used on speeds up to 2000 R. P. M. when the meter is plugged in jack 47 or any other jack that has a value lower than "60." Above this value the meter will not read up to 2000 R. P. M. but a proportional amount below.

While applicant does not intend to be limited by the exact type of equipment employed or by the resistance values herein given, it is believed that the following data will be helpful to a more complete understanding of the invention. The motor 6 may be of the universal, 60 cycle, alternating current or direct current type, magneto 28 may be a Weston magneto model No. 440, type A, while the meter may be a Weston voltmeter model No. 629. The following values for the several resistance units have been found to give the desired reading in connection with the type of magneto used:

| Ohms | Ohms | Ohms |
|---|---|---|
| A—165.0 | H—50.0 | O— 23.8 |
| B—135.0 | I—44.0 | P— 21.7 |
| C—109.0 | J—39.2 | X—600 |
| D— 91.0 | K—35.3 | Y—220 |
| E— 76.0 | L—31.5 | |
| F— 66.9 | M—28.5 | |
| G— 57.1 | N—26.0 | |

The invention herein described may be utilized for various purposes. For example if it is desired to obtain the true reading of the rate of projection on the indicator or meter 30, all that is necessary is to insert the plug 32 into the jack 47 and read the upper scale of the meter, remembering to multiply by the factor 100 since it is graduated in units of 10 frames per minute. This same reading may be obtained by moving the single pole, double throw switch 34 to the position marked "Check" whereupon the meter will give the desired reading as before. With the switch 34 in this position the plug 32 can be inserted in any of the jacks 31 without affecting the reading. The meter readings of course can be adjusted to any value simply by changing the speed of projection, that is, the speed of motor 6 which is controlled by moving the handle 36 of rheostat 46.

In addition to the above use of the invention, it may be employed to give, a predetermined rate of effort based on any wage incentive system such as B's per hour rate where B is the unit of work performed by an average workman in a minute. If for example there is being projected a motion picture of a cycle of operations at a 50 B per hour rate and it is desired to study the workman's normal rate as well as his effort and motion at a higher or lower rate as the case may be, the operator inserts the plug 32 in the "No. 50 jack" and adjusts the handle 36 of the resistance 46 to bring the projector up to that desired speed which is indicated when the needle of the meter 30 points to "50" on the B's per hour division of the lower scale. If it is desired to increase the representation of the workman's speed, this may be done by increasing the speed of projection by means of the motor resistance 46 and the apparent speed of the workman or operator will be indicated on the lower scale of meter 30 without further adjustment. The same method applies to obtaining a lower speed picture but the foregoing example refers to showings of pictures of workmen who were rated at any one of the following rates 40, 45, 50, 55 .... 105, 110, 115, 120 inclusive. However, working at the 47 B per hour rate, it is necessary to insert the plug 32 in the "No. 50" jack and adjust the resistance Y until the reading on the lower scale of the meter 30 indicates 47. Of course, while the projector is operating, its speed must be 1000 frames per minute which was the rate at which the pictures were taken. In order to know that the projector is operating at this speed it is necessary to throw the switch 34 into the position marked "Check" and vary the speed of the meter 6 by means of the resistance 46 until the upper scale of the meter 30 indicates 1000. When photographs of operators working at rates corresponding to the numbers associated with the jacks 31 are projected, the variable resistance Y must be in its zero position.

By means of the arrangement above-described time study work and factory management is greatly facilitated and rendered much more accurate. It will be understood that the present disclosure is capable of a wide number of variations, limited only by the following claims, without departing from this invention.

What I claim as my invention is:

1. In a device of the character described, the combination with a motion picture projector, of an electrical tachometer actuated from said projector and a resistance means for calibrating said tachometer to indicate the ratio of the apparent speed of the projected object to a standard speed.

2. In a device of the character described the combination with a motion picture projector adapted to receive a photographic record having a cycle of operations depicted thereon, of means for operating said projector to project a motion picture from said record at any one of a plurality of different speeds, a magneto driven from said operating means, a circuit network including an electrical indicating device connected to the output of said magneto, said indicating device being graduated in units of effort per unit of time for a predetermined wage incentive system, and a plurality of resistance units each unit being calibrated to a different standard of effort and being selective and connectible into said circuit network so that said electrical measuring device indicates when a desired rate of effort for the predetermined wage incentive system is being represented by the projected motion picture.

3. In a device of the character described the combination with a motion picture projector adapted to receive a photographic record having a cycle of operations depicted thereon, of means for operating said projector to project a motion picture from said record at any one of a plurality of different speeds, a magneto driven from said operating means, a circuit network including an electrical indicating device connected to the output of said magneto, said indicating device being graduated in units of effort per unit of time for a predetermined wage incentive system, a plurality of resistance units, each unit being calibrated to a different standard of effort and being selective and connectible into said circuit network so that said electrical measuring device indicates when a desired rate of effort for the predetermined wage incentive system is being represented by the projected motion picture, and a resistance unit connected in shunt across the terminals of said electrical indicating device whereby the values of the resistance units connectible into said circuit network may be greatly reduced.

4. In a device of the character described the combination with a motion picture projector, and means for operating said projector to project a motion picture from a photographic record passing therethrough, of a magneto having a characteristic of developing electrical energy in proportion to the speed at which it is driven, means for driving said magneto from the operating means of said projector, and an electrical indicating device actuated by said magneto, said indicating device being calibrated to show the number of pictures projected per unit of time and the ratio of the apparent speed of the object projected on a screen to a standard object, a circuit network having a plurality of calibrating units connectible therein, each of said units corresponding to a different standard, and means for connecting a desired unit into said network.

5. In a device of the character described the combination with a motion picture projector, and means for operating said projector at any one of a plurality of different speeds, of a magneto driven from said operating means, a circuit including an electrical indicating device and the output of said magneto, said indicating device being graduated in units of effort per unit of time for a predetermined wage incentive system, a resistance element having portions thereof, each calibrated to a different standard of effort per unit of time with respect to said indicating device, and means for connecting into said network the portion of said resistance element corresponding to the desired standard to be indicated on said indicating device.

6. In a device of the character described, the combination with a motion picture projector, of an electrical tachometer actuated from said projector, resistance means for calibrating said tachometer to indicate the speed of projection and to indicate the ratio of the apparent speed of the projected object to a standard speed, and switch means for connecting said resistance and tachometer to make either of said indications.

Signed at Rochester, New York, this 18th day of December, 1928.

LAURENCE T. LITTLEFIELD.